United States Patent
Simeonov (10) Patent No.: US 7,716,677 B2
(45) Date of Patent: May 11, 2010

(54) SYSTEM AND METHOD FOR MAPPING CONTAINER MANAGED PERSISTENCE PERSISTENT OBJECT STATES TO JAVA DATA OBJECT STATES

(75) Inventor: Ivo Simeonov, Sofia (BG)

(73) Assignee: SAP AG, Walldorf (DE)

( * ) Notice: Subject to any disclaimer, the term of this patent is extended or adjusted under 35 U.S.C. 154(b) by 1534 days.

(21) Appl. No.: 11/024,159

(22) Filed: Dec. 27, 2004

(65) Prior Publication Data
US 2006/0143224 A1    Jun. 29, 2006

(51) Int. Cl.
*G06F 13/00* (2006.01)
(52) U.S. Cl. ...................................... 719/313; 707/100
(58) Field of Classification Search .................. 719/313
See application file for complete search history.

(56) References Cited

U.S. PATENT DOCUMENTS

| | | | |
|---|---|---|---|
| 7,266,816 B1 * | 9/2007 | Sharma et al. | 717/170 |
| 2003/0182273 A1 * | 9/2003 | Goldberg et al. | 707/3 |

* cited by examiner

*Primary Examiner*—Hyung S Sough
*Assistant Examiner*—Syed Roni
(74) *Attorney, Agent, or Firm*—Schwegman, Lundberg & Woessner, P.A.

(57) ABSTRACT

A system and method for mapping Container Managed Persistence (CMP) persistent object states to Java Data Object (JDO) states. In an embodiment, mapping logic identifies a state of a CMP persistent object. The identified CMP persistent object state is mapped to a JDO state. In an embodiment, the mapping is based, at least in part, on whether the CMP persistent object is associated with a transactional context.

17 Claims, 9 Drawing Sheets

Legend

? Optional element
* Multiple usage of this element is possible
+ Contains sub-elements
 DTD element attribute
 DTD element

| Method | DEFAULT + not loaded 720 | DEFAULT + loaded 722 | UPDATED 724 | CREATED 726 | V_REMOVED 728 | REMOVED 729 |
|---|---|---|---|---|---|---|
| Read 730 | DEFAULT + LOADED | DEFAULT + loaded | UPDATED | CREATED | error | error |
| Write 732 | UPDATED 750 | UPDATED | UPDATED | CREATED | error | error |
| Delete 734 | REMOVED | REMOVED | REMOVED | V_REMOVED | error | error |
| Create 736 | error | error | error | error | CREATED | UPDATED |
| Flush 738 | DEFAULT+ not loaded | DEFAULT + loaded | DEFAULT + loaded | DEFAULT + loaded | V_REMOVED | V_REMOVED |
| Commit or Rollback 740 | Garbage Collected | Garbage Collected | Garbage Collected | Garbage Collected | Garbage Collected | Garbage Collected |

SYSTEM AND METHOD FOR MAPPING CONTAINER MANAGED PERSISTENCE PERSISTENT OBJECT STATES TO JAVA DATA OBJECT STATES

TECHNICAL FIELD

Embodiments of the invention generally relate to the field of data processing and, more particularly, to a system and method for mapping Container Managed Persistence (CMP) persistent object states to Java Data Object (JDO) states.

BACKGROUND

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

Figure 1:
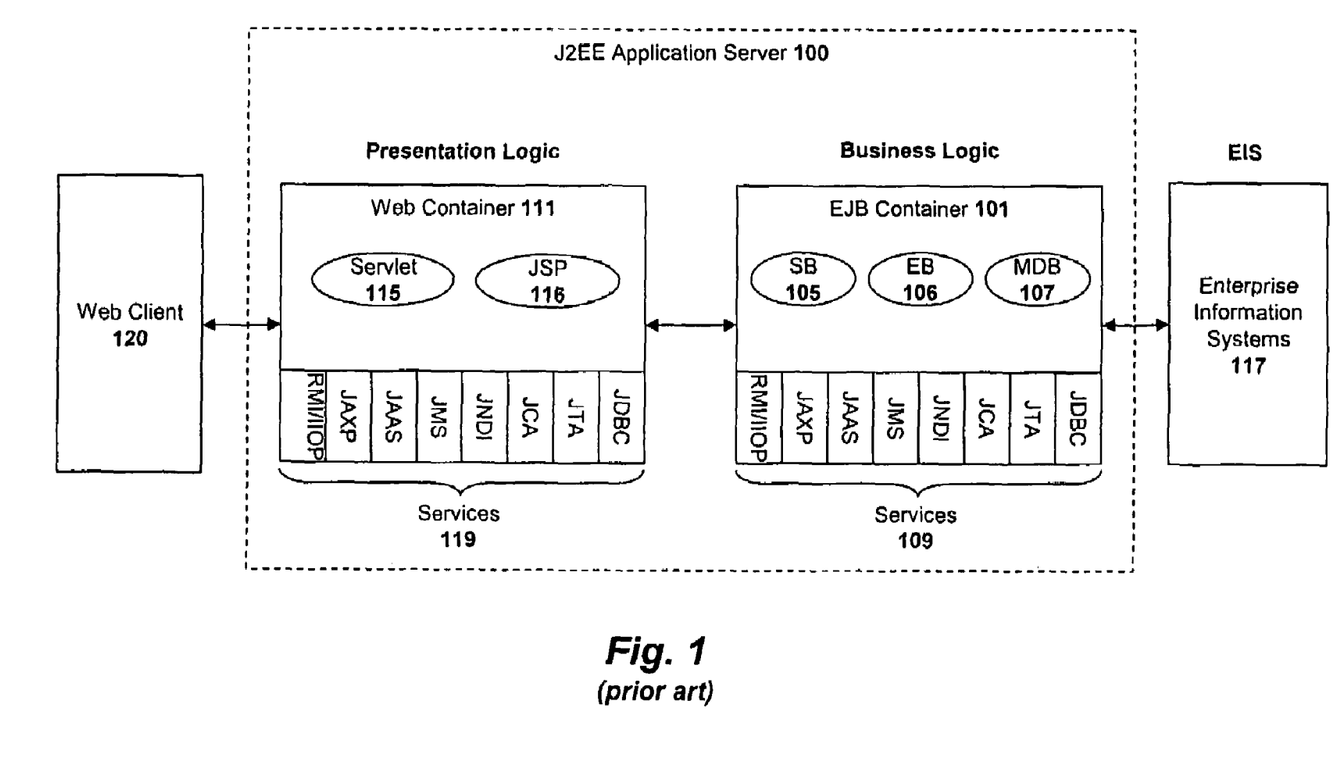
FIG. 1 is a block diagram illustrating several layers within a prior art J2EE architecture.

FIG. 1 illustrates an exemplary J2EE application server 100 in which the presentation layer is implemented as a Web container 111 and the business layer is implemented as an Enterprise JavaBeans ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors (described in greater detail below).

As illustrated in FIG. 1, each layer of the J2EE architecture includes multiple containers. Web container 111, for example, is itself comprised of a servlet container 115 for processing servlets and a Java Server Pages ("JSP") container 116 for processing Java server pages. EJB container 101 includes three different containers for supporting three different types of enterprise Java beans: a session bean container 105 for session beans, an entity bean container 106 for entity beans, and a message driven bean container 107 for message driven beans. The EJB specification defines, among other things, aspects of the three types of enterprise Java beans. The EJB specification refers to any of the EJB specifications including, for example, the specification entitled, "Enterprise JavaBeans™ Specification Version 2.1," (Nov. 12, 2003). A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

The information systems of a modem day enterprise (such as a corporation or government institution) are often responsible for managing and performing automated tasks upon large amounts of data. Persistent data is that data that "exists" for extended periods of time (i.e., it "persists"). Persistent data is typically stored in a database so that it can be accessed as needed over the course of its existence. Here, complex database software (e.g., such as DB2, Oracle, and SQL Server) is often used to read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction."

Figure 2:
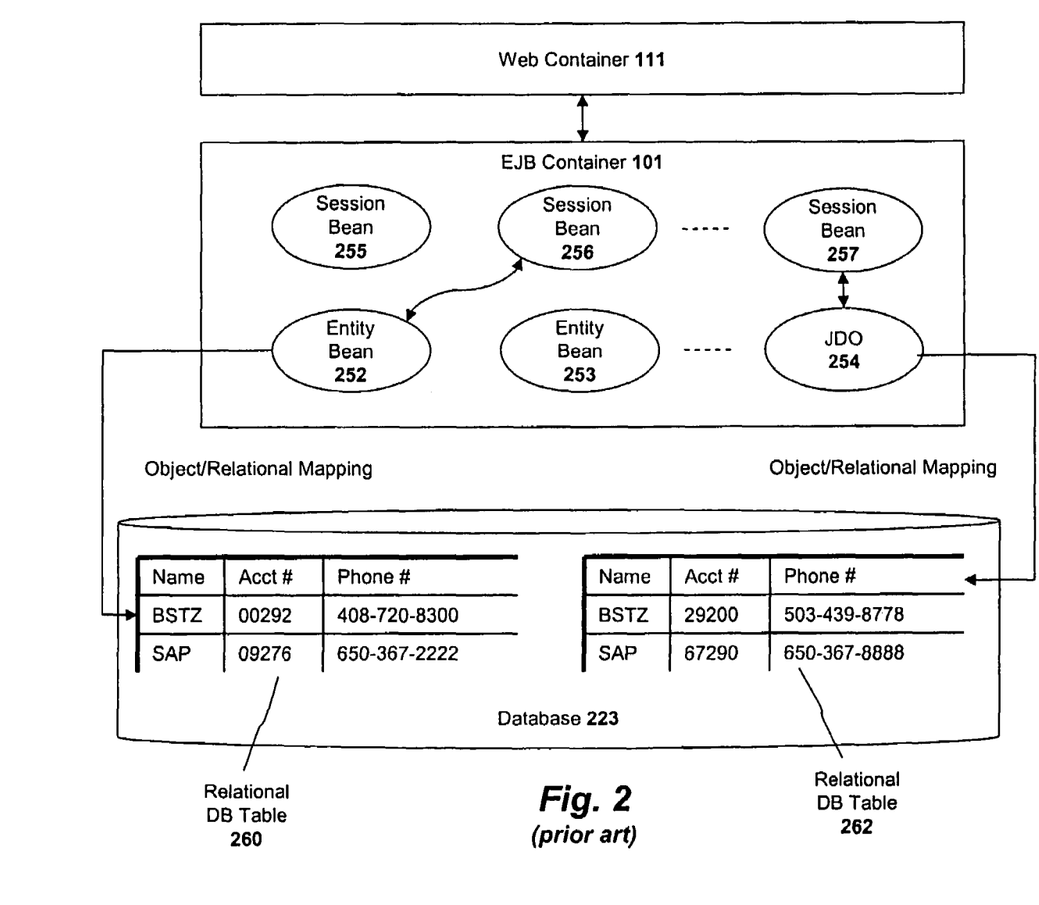
FIG. 2 is a block diagram illustrating the conventional approach of using separate Object/Relational (O/R) mapping for an entity bean and a Java Data Object.

FIG. 2 illustrates the manner in which persistent data is managed in current J2EE environments. Session beans 255-257 comprise the high level workflow and business rules implemented by application server 100. For example, in a customer relationship management ("CRM") system, session beans define the business operations to be performed on the underlying customer data (e.g., calculate average customer invoice dollars, plot the number of customers over a given timeframe, . . . etc.).

Session beans typically execute a single task for a single client during a "session." Two versions of session beans exist: "stateless" session beans and "stateful" session beans. As its name suggests, a stateless session bean interacts with a client without storing the current state of its interaction with the client. By contrast, a stateful session bean stores its state across multiple client interactions.

Entity beans are persistent objects which represent data (e.g., customers, products, orders, . . . etc.) stored within a database 223. Typically, an entity bean 252 (or 253) is mapped to a table 260 in the relational database and, as indicated in FIG. 2, each "instance" of the entity bean is typically mapped to a row in the table (referred to generally as an "object/relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands and/or Java Data Objects model). By contrast, with container-managed persistence, the EJB container 101 manages the underlying calls to the database.

The Java Data Objects (JDOs) specification defines a persistence mechanism in which the Java language is used to persist and retrieve data. The JDO specification refers to any of the JDO specifications including, for example, Java Specification Request (JSR)-000012 entitled, "Java Data Objects." A JDO persistence capable class (or, for ease of reference, a JDO) is an object that can be stored in and retrieved from a persistent data store (e.g., database 223). More specifically, a JDO is a class that implements the javax.jdo.PersistenceCapable interface. Java Data Object (JDO) 254 represents data stored in database 223. Typically, a JDO (e.g., JDO 254) is mapped to a database table (e.g., table 262) and each field of the JDO is mapped to a column of the database.

The term O/R mapping metadata refers to metadata that defines a mapping between an object and a relational database. The O/R mapping metadata for each application is declaratively described and is typically stored in an eXtensible Markup Language (XML) file. These files are commonly called O/R mapping metadata files. The structure of O/R mapping metadata files is not specified by either the EJB specification or the JDO specification. In conventional systems, Container-Managed Persistence (CMP) entity beans and JDOs have separate O/R mapping metadata files. Thus, in conventional systems, an O/R mapping metadata file can map either an entity bean or a JDO to a database, but not both.

SUMMARY OF THE INVENTION

Embodiments of the invention are generally directed to a system and method for mapping Container Managed Persistence (CMP) persistent object states to Java Data Object (JDO) states. In an embodiment, mapping logic identifies a state of a CMP persistent object. The identified CMP persistent object state is mapped to a JDO state. In an embodiment, the mapping is based, at least in part, on whether the CMP persistent object is associated with a transactional context.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for mapping Container Managed Persistence (CMP) persistent object states to Java Data Object (JDO) states. In an embodiment, mapping logic identifies a state of a CMP persistent object. As is further discussed below, the identified CMP persistent object state is mapped to a JDO state. In an embodiment, the mapping is based, at least in part, on whether the CMP persistent object is associated with a transactional context.

Figure 3:
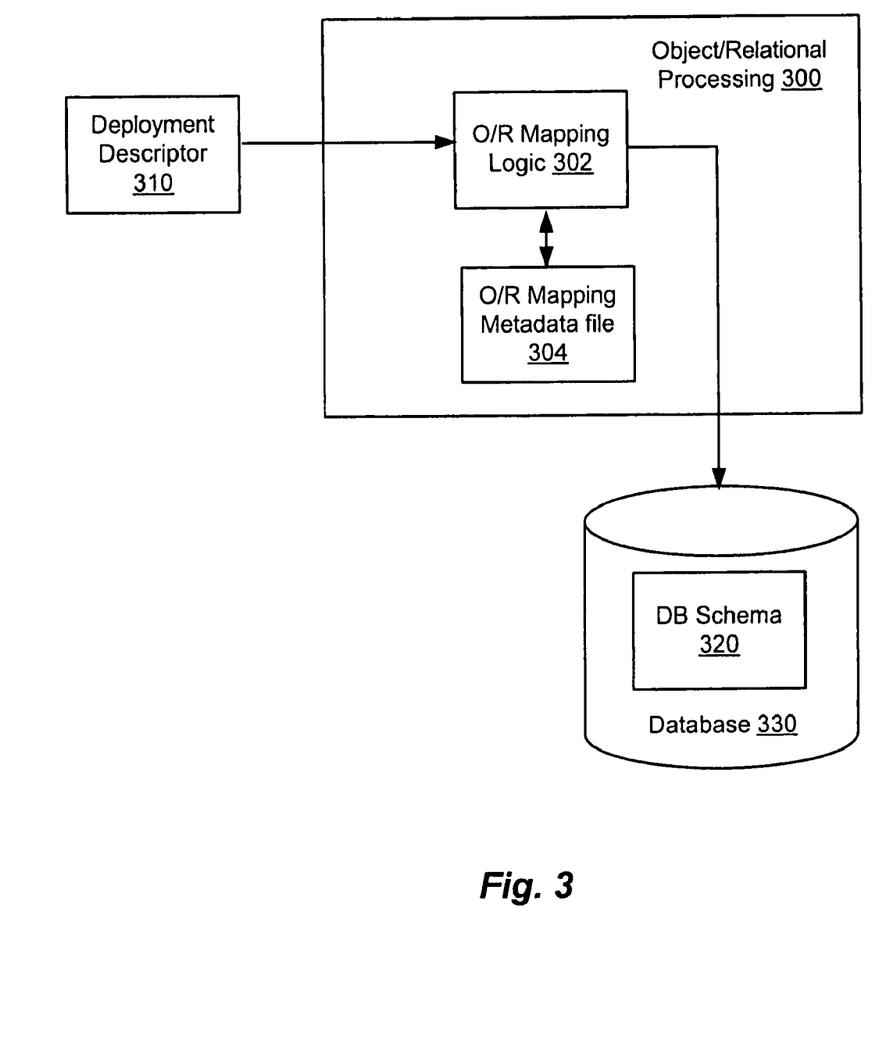
FIG. 3 is a block diagram illustrating selected elements of an O/R processing module, according to an embodiment of the invention.

FIG. 3 is a block diagram illustrating selected elements of O/R processing module 300, according to an embodiment of the invention. O/R processing module 300 includes O/R mapping logic 302 and common O/R mapping metadata file 304. As indicated in FIG. 3, O/R mapping logic 302 receives deployment descriptor file 310. A "deployment descriptor file" defines metadata for the component or application with which it is associated. In one embodiment, deployment descriptor file 310 defines, at least in part, the deployment of an entity bean or a JDO onto an application server (e.g., application server 100, shown in FIG. 1). For each entity bean or JDO, the deployment descriptor defines "persistent fields" which represent and store a single unit of data, and "relationship" fields which represent and store references to other persistent data. The deployment descriptor also includes O/R mapping metadata. In one embodiment, deployment descriptor file 310 is an XML file. Embodiments of the invention, however, are not limited to any particular file type.

O/R mapping logic 302 maps one or more elements of deployment descriptor 310 to database schema 320 based, at least in part, on common O/R mapping metadata file 304. As is further described below, in an embodiment, common O/R mapping metadata file 304 provides a mapping for both an entity bean (or entity beans) and a JDO (or JDOs) to database schema 320. Database schema 320 provides metadata defining the structure of (and constraints on) one or more tables of database 330. In one embodiment, database schema 320 is an XML file. In an alternative embodiment, database schema 320 is structured according to the syntax and semantics of a different language (e.g., a different markup language). In an embodiment, O/R mapping metadata file 304 is part of deployment descriptors 310. O/R mapping logic 302 maps persistent fields (at the object layer) of CMP or JDO to a database element specified by O/R mapping metadata file 304.

In an embodiment, O/R processing module 300 may be part of a multi-tiered network. The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG.

Figure 4:
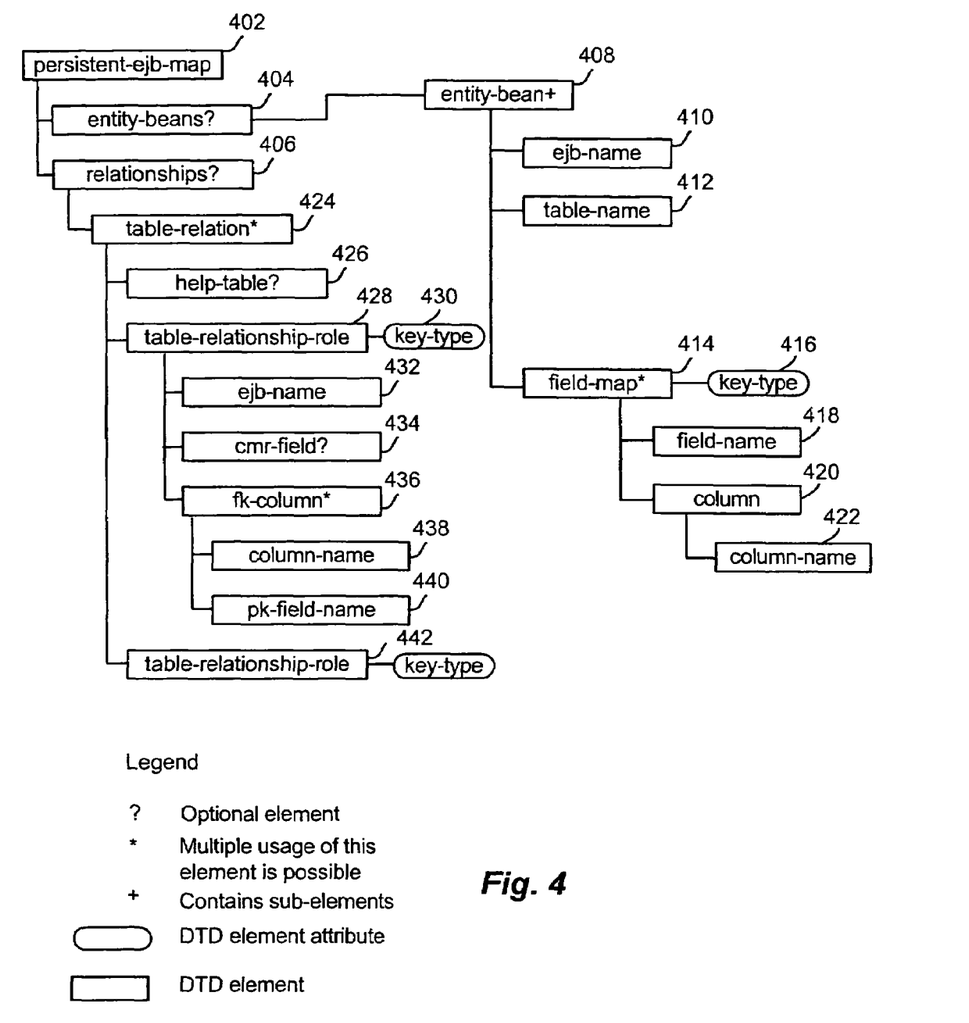
FIG. 4 is a block diagram illustrating an example of O/R mapping metadata (Data Type Definition (DTD) used by the metadata XML) for a CMP entity bean abstract schema.

FIG. 4 is a block diagram illustrating mapping metadata for a CMP abstract schema (typically comprising many CMP entity beans, e.g., entity bean 252, shown in FIG. 2). Persistent-ejb-map element 402 is the root element and it contains information about the persistent fields of one or more entity beans and relationships among the entity beans. For example, entity-beans element 404 contains a list of the entity beans to which the metadata applies and relationship element 406 describes the relationships between the entity beans in the database tables.

Entity-bean element 408 specifies a mapping between an entity bean and a particular database table. EJB-name element 410 provides the name of the entity bean (e.g., as defined in the ejb-jar.xml of the entity bean) and table-name element 412 provides the name of the database table to which the entity bean is mapped. The entity bean described by entity-bean element 408 typically includes one or more fields of data to be persisted on the database table. Typically, each of the one or more fields is mapped to a particular column of the database table. Field-map element 414 defines the mapping between the fields of the entity bean and the columns of the table that is identified by element 412.

Relational databases typically include columns having different column types. In one embodiment, the column that stores a value for a cmp-field (e.g., non-relationship field) may be of types: primary key, no key, or unique key. A primary key type column refers to a column that contains the primary key for the database table. A no key type column, as the name implies, refers to a column that does not contain a key for the database table. The unique key type column refers to a column that contains a unique key for the database table. In an embodiment, key-type element 416 specifies a column type for the columns referenced in field-map element 414. Field-name element 418 specifies a field of the entity bean and column element 420 contains metadata for the column to which the field is mapped (e.g., a column name as provided by column-name element 422).

Relationships element 406 specifies relationships between entity beans. A relationship between entity beans is characterized by its multiplicity (e.g., 1:1, 1:M, M:N). A relationship is "one-to-one" if each entity bean is associated with a single instance of another entity bean and "one-to-many" if each entity bean is associated with many instances of another entity bean. A relationship is "many-to-many" if entity bean instances may be related to multiple instances of each other.

Table-relation element 424 defines a relationship between two entity beans using references between primary key column(s) and foreign key column(s), or logical foreign key column(s). A column is called "a logical foreign key" if it is a column that contains the values of the referenced table's primary key column, but is not declared as a foreign key. As used herein, the term "foreign key" refers to both a standard foreign key and a logical foreign key.

Help-table element 426 provides the name of a join table which is used in the case of an M:N relationship. In many-to-many bidirectional relationships, there are corresponding fields of set type on both sides of the relationship. In the relational model there is typically a database table that contains foreign keys to one table of both sides of the many-to-many bidirectional relationship. The term "join table" refers the database table that contains these foreign keys. The terms bidirectional relationship and unidirectional relationship refer to the object representation of a relationship. Typically relationships with multiplicity 1:1, 1:M, or M:1 are represented in the database by pair(s) (primary key column, foreign key column). In the case of a compound primary key (e.g., a primary key consisting of many columns) many pairs are used. Primary key columns are part of the "one side of the relationship" bean's table while foreign key columns are part of the "other side of the relationship" bean's table and they refer to the primary key columns. In the case of a M:M relationship a join table is used. Some of the join table columns are foreign key columns that refer to the primary key columns of the "one side of the relationship" bean's table. The remaining columns of the join table are foreign key columns that refer to the primary key columns of the "other side of the relationship" bean's table.

Table-relationship-role element 428 specifies a role in the database (primary key or foreign key side) for the relationship using key-type element 430. Each relationship has two sides. Each of the two sides is described by a table-relationship-role element. The table relationship role refers to which side of the relationship (e.g., either referencing or referenced) element 428 is directed. For example, if key-type element 430 specifies "primary key," then element 428 is directed to the referenced side of the relationship. Alternatively, if key-type element 430 specifies either "no key" or "foreign key," then element 430 is directed to the referencing side of the relationship. In either case, ejb-name element 432 and cmr-field 434, respectively, provide the name of the entity bean and field that is ether referencing or referenced by the relationship. If element 428 is directed to the referencing side of the relationship, Fk-column-name element 436 specifies a foreign key column and its reference to a corresponding primary key field. For example, column-name element 438 provides the name of the foreign key column and Pk-field-name element 440 provides the name of the referenced primary key field. Table-relationship-role element 442 defines the opposing role to the role defined by element 428. That is, if element 428 specifies the "referencing side" of relationships, then element 442 specifies the "referenced" side of one or more relationships. At the object layer the ejb-name and cmr-field uniquely identify the described relationship. Thus, ejb-name field element 432 and cmr-field element 434 are used to specify the relationship.

Figure 5:
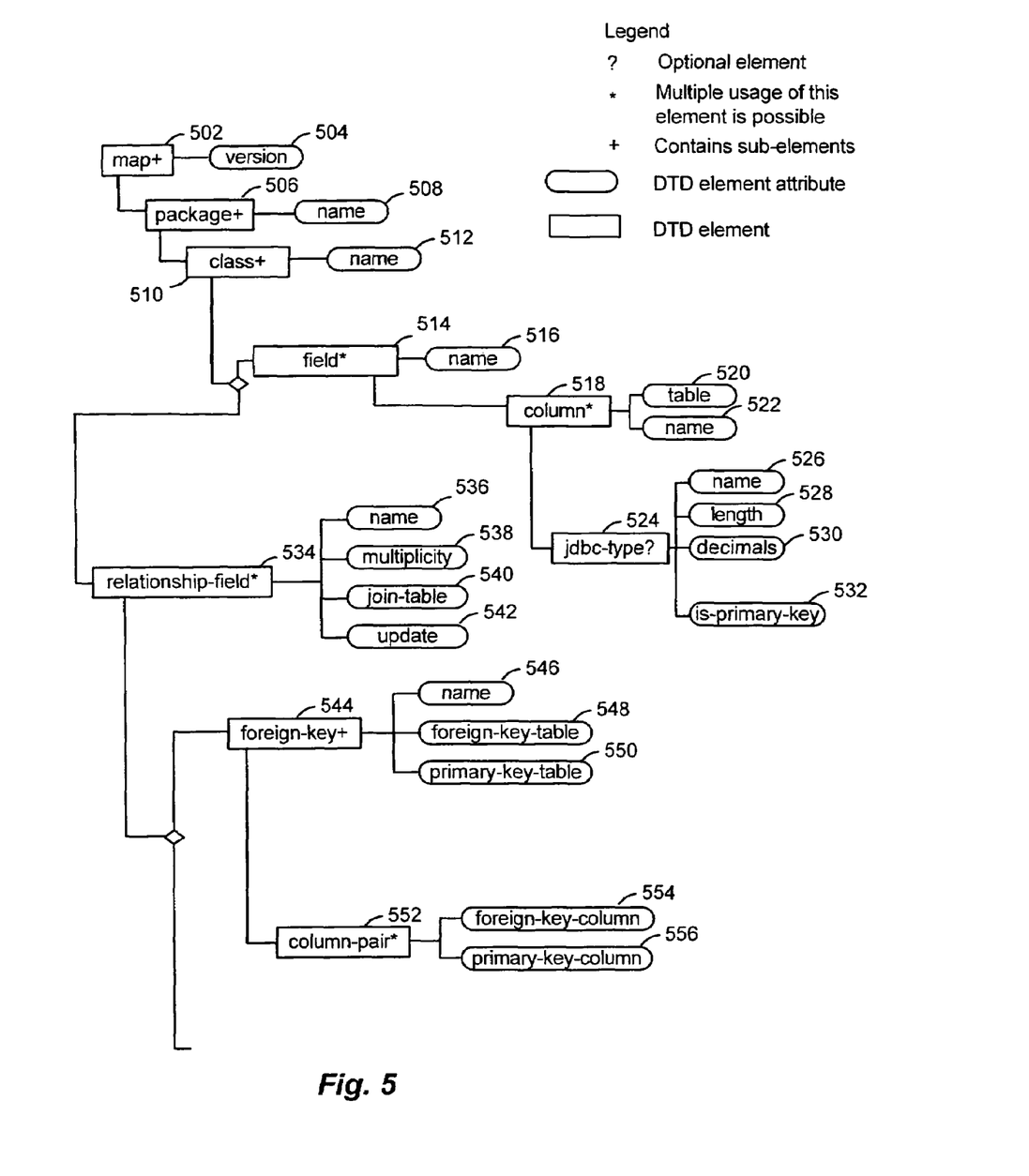
FIG. 5 is a block diagram illustrating an example of O/R mapping metadata (DTD) used by the metadata XML) for a Java Data Object model.

FIG. 5 is a block diagram illustrating mapping metadata for a JDO (e.g., JDO 254, shown in FIG. 2). In general terms, the relation to the JDO object model is facilitated through the class and field elements. The relation to the database schema is facilitated through the column and foreign key elements.

Map element 502 is the root element and includes version attribute 504 to specify the version of the mapping metadata. Package element 506 includes all classes of a particular package that is identified by name attribute 508.

Class element 510 includes the relationship and non-relationship fields of the class identified by name attribute 512. Class element 510 includes a field element 514 for each persistent non-relationship field of the class. Name attribute 516 is the field name as defined in the class. Field element 514 includes metadata specifying the column to which a corresponding field is mapped. For example, column element 518 contains a description of a column to which field element 514 is mapped. Column element 518 includes, for example, table attribute 520 and name attribute 522. Name attribute 522 provides the name for the column. Table attribute 520 specifies the table to which the column belongs.

JDBC type element 524 describes the JDBC type of column 518. The JDBC type is identified by the following attributes: name 526, length 528, and decimals 530. In an embodiment, JDBC type element 524 is optional and is typically used when no catalog information is available for the column. JDBC type element 524 also includes is-primary-key attribute 532. In an embodiment, is-primary-key attribute 532 specifies whether column 518 contains a primary key of the table.

Class element 510 includes a relationship-field element 534 for each persistent relationship field of the class. Relationship-field element 534 contains, for example, the foreign keys and generic persistent references for the relationship. Field name attribute 536 contains the name of the persistent relationship field as defined by the class. Multiplicity attribute 538 is "one" or "many," depending on the relationship type (e.g., 1:1, 1:M, M:M, etc.). Join-table attribute 540 specifies whether a join table is used (e.g., with a true/false value). Update attribute 542 specifies whether the value of this relationship field is used for updating the database. Update attribute 542 is relevant for many-to-many and one-to-one bidirectional relationships. In such cases, one of the sides of the relationship is declared as non-updatable.

Foreign-key element 544 describes a foreign key in the database. Name attribute 546 provides the name of the foreign key. Foreign-key-table attribute 548 and primary-key-table attribute 550, respectively, specify the foreign key and primary key tables in the database. Column-pair element 552 contains one or more column pairs (e.g., attributes 554-556) corresponding to the columns in the foreign key and primary key tables specified in foreign-key element 544.

Figure 6:
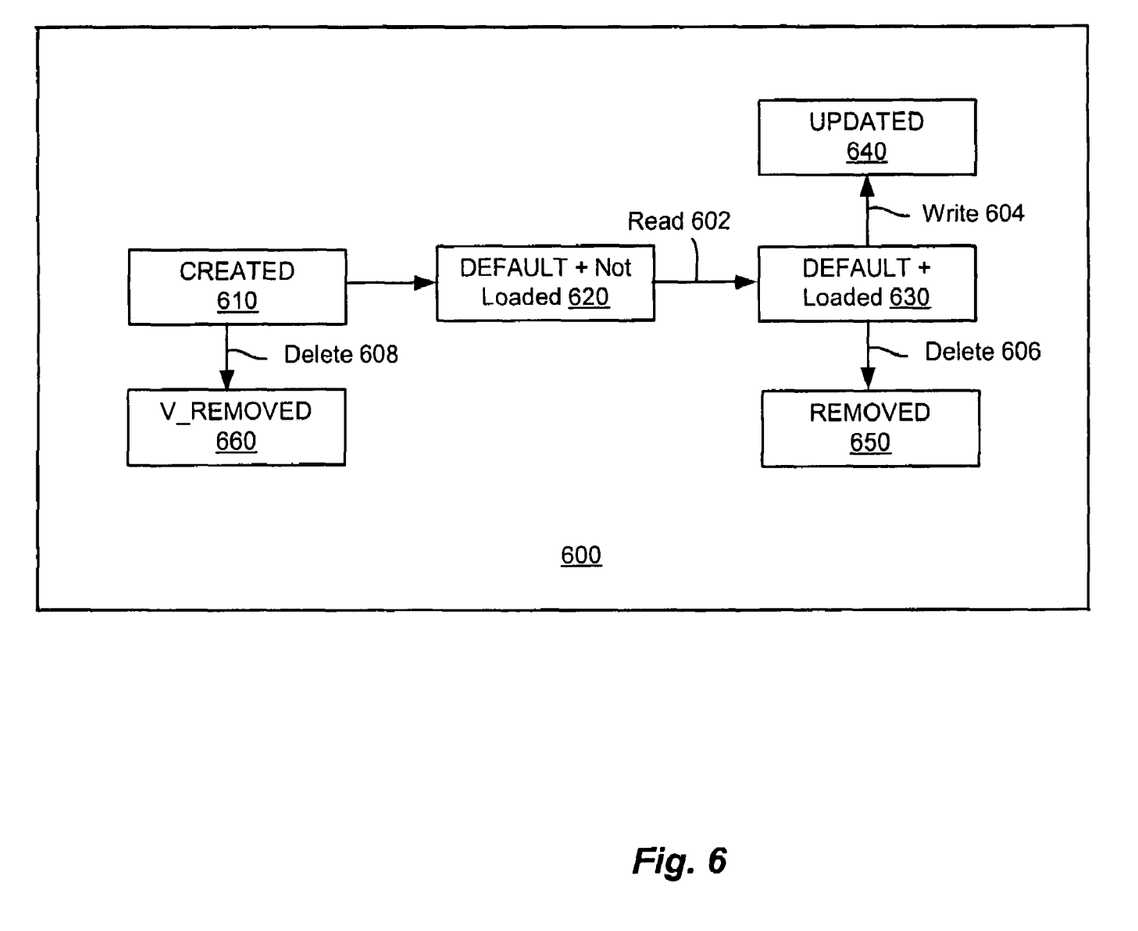
FIG. 6 is a block diagram illustrating selected states of a Container Managed Persistence (CMP) persistent object.

FIG. 6 is a block diagram illustrating selected states of a CMP persistent object 600. In an embodiment, CMP persistent object 600 includes the following states: CREATED 610, DEFAULT+Not Loaded 620, DEFAULT+Loaded 630, UPDATED 640, REMOVED 650, and V_REMOVED 660. In an alternative embodiment, CMP persistent object 600 may have more states, fewer states, and/or different states.

CREATED state 610 applies to instances of a CMP persistent object that have been made persistent in the current transaction and have not yet been saved. An instance of a CMP persistent object is in DEFAULT+Not Loaded state 620 if it represents an object in the data store whose values have not yet been loaded from the data store into the instance. If the instance represents a specific instance in the data store whose values are loaded (e.g., via read operation 602) but whose values have not been changed in the current transaction, then the instance is in DEFAULT+Loaded state 630. The instance of a CMP persistent object is in UPDATED state 640 if persistent data has been modified (e.g. via write operation 604) during the current transaction and the modifications have not yet been committed. A CMP persistent object that has been deleted in the current transaction (e.g., via delete operation 606) is in REMOVED state 650. A CMP persistent object that has been created in the current transaction but does not represent a specific object on the data store and that has been deleted (e.g., via delete operation 608) is in V_REMOVED state 660.

Figure 7:
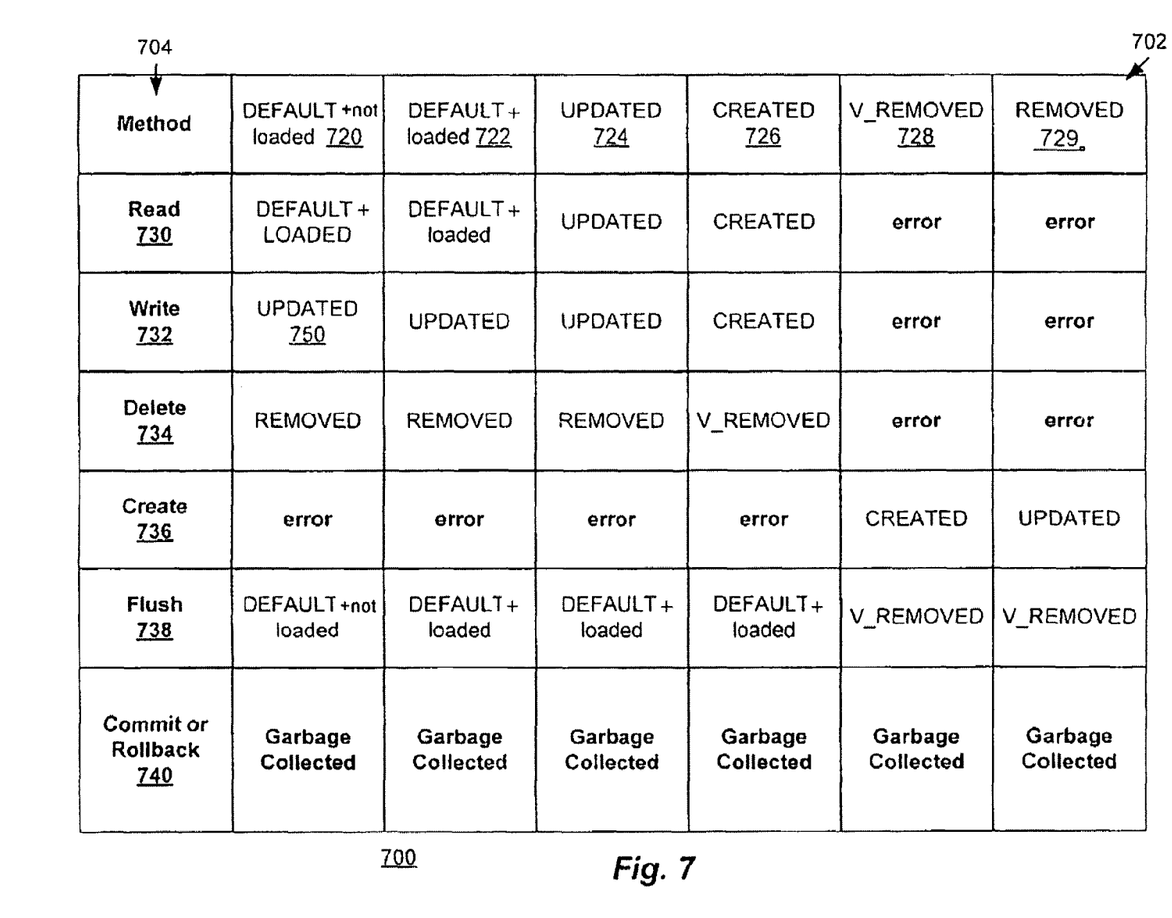
FIG. 7 is a table illustrating selected state transitions for a CMP persistent object, according to an embodiment of the invention.

The term "state transition" refers to transitioning, either directly or indirectly, from a first state to a second state. A CMP persistent object may change state, for example. in response to certain method calls. FIG. 7 shows table 700 to illustrate selected state transitions for a CMP persistent object according to an embodiment of the invention. Row 702 lists selected CMP persistent object states 720-729. Column 704 lists selected method calls 730-740 that may invoke a state transition. The listed values show state transitions that occur in response to method calls 730-740. For example, if write method 732 is called, when the CMP persistent object is in DEFAULT+Not Loaded state 720, then the CMP persistent object transitions to UPDATED state 750. In an alternative embodiment, state transitions other than those shown in table 700 are possible.

Figure 8:
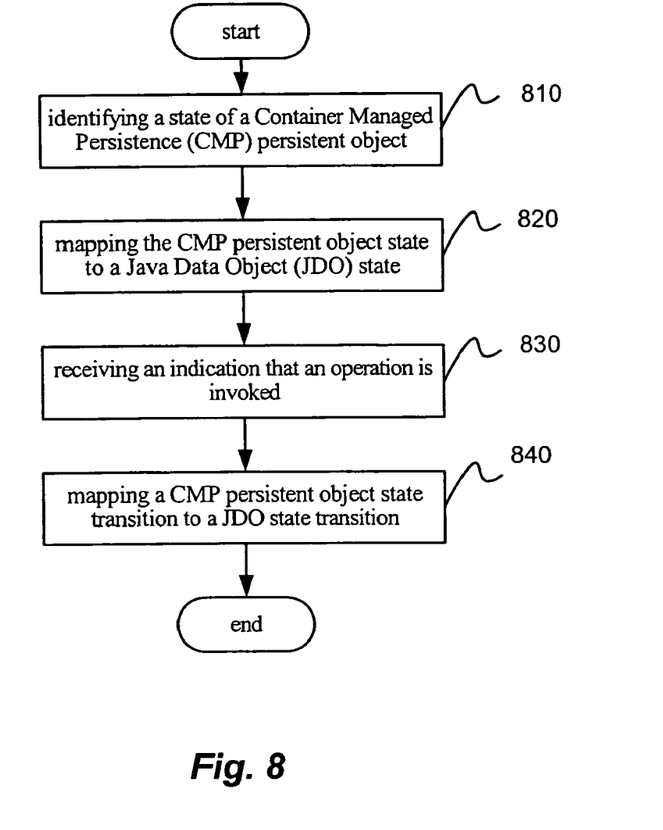
FIG. 8 is a flow diagram illustrating certain aspects of a method for mapping a CMP persistent object state to a JDO state, according to an embodiment of the invention.
Figure 9:
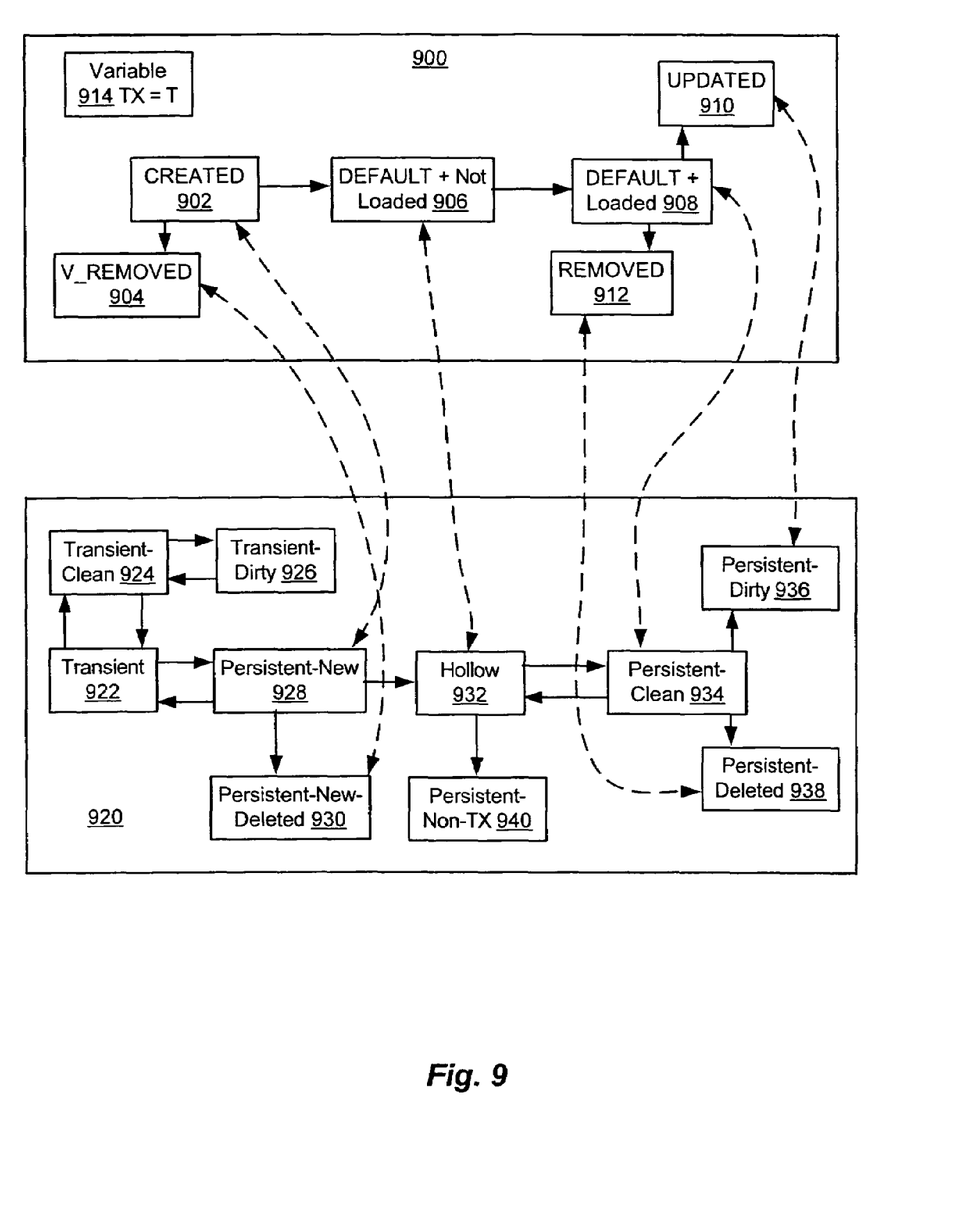
FIG. 9 is a conceptual illustration of mapping a CMP persistent object state to a JDO state when the CMP persistent object is associated with a transactional context.

Turning now to FIGS. 8-9, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for mapping a CMP persistent object state to a JDO state, according to an embodiment of the invention. Referring to process block 810, the state of a CMP persistent object is identified. In one embodiment, the state of the CMP persistent object is identified by querying an internal variable representing the current state of the CMP persistent object. The current state of the CMP persistent object may be one of a predetermined set of persistent object states. For example, in one embodiment, the current state of the CMP persistent object is one of the states illustrated in FIG. 6.

Related operations on persistent data are often grouped together into a unit of work that forms a logical operation from an application's perspective. The term "transaction" refers to such units of work and additionally refers to ensuring that concurrent units of work are executed in an atomic, consistent, isolated, and durable manner as if the concurrent units of work were executed serially one after the other. The term "transactional context" refers to operating on a persistent object within the context of a transaction. In an embodiment, operations may or may not be performed on a CMP persistent object within a transactional context.

Referring to process block 820, the current state of the CMP persistent object is mapped to a Java Data Object (JDO) state. The term "JDO state" refers to one of the JDO life cycle states as described, for example, in the JDO specification. The JDO life cycle states may include: Transient-Clean, Transient-Dirty, Transient, Persistent-New, Persistent-New-Deleted, Hollow, Persistent-Clean, Persistent-Dirty, and Persistent-Deleted. The term "mapping" broadly refers to determining a JDO state that corresponds to the identified state of the CMP persistent object. As is further described below, the mapping of a CMP persistent object state to a JDO state is based, at least in part, on whether the CMP persistent object is associated with a transactional context.

FIG. 9 is a conceptual illustration of mapping the identified CMP persistent object state to a JDO state when the CMP persistent object is associated with a transactional context, according to an embodiment of the invention. FIG. 9 includes selected aspects of CMP persistent object 900 and JDO 920. CMP persistent object 900 includes states 902-912 and internal variable 914. In an embodiment, internal variable 914 provides an indication of whether CMP persistent object 900 is associated with a transactional context. JDO 920 includes JDO states 922-940.

As shown in FIG. 9, each CMP persistent object state can be mapped to a particular JDO state. Table 1 illustrates the mappings of CMP persistent object states to JDO states according to an embodiment of the invention. In an alternative embodiment, more mappings, fewer mappings, and/or different mappings may be possible.

TABLE 1

| TRANSACTIONAL CONTEXT | |
| --- | --- |
| CMP Persistent Object State | Corresponding JDO State |
| DEFAULT + loaded | Persistent-Clean |
| DEFAULT + not loaded | Hollow |
| UPDATED | Persistent-Dirty |
| CREATED | Persistent-New |
| REMOVED | Persistent-Deleted |
| V_REMOVED | Persistent-New-Deleted |

If CMP persistent object 900 is not associated with a transactional context, then the mapping of CMP persistent object states to JDO states is different than the mapping shown in FIG. 9. Table 2 illustrates the mappings of CMP persistent object states to JDO states when CMP persistent object 900 is not associated with a transactional context. In an alternative embodiment, more mappings, fewer mappings, and/or different mappings may be possible.

TABLE 2

| NON-TRANSACTIONAL CONTEXT | |
| --- | --- |
| CMP Persistent Object State | Corresponding JDO State |
| DEFAULT + loaded | Persistent-Non-Transactional |
| DEFAULT + not loaded | Hollow |

The solid lines having an arrow on the end that are shown in FIG. 9 provide examples of state transitions. These state transitions merely provide an example of selected state transitions. A more complete example of possible state transitions for CMP persistent object 900 is shown in FIG. 7. In addition, the JDO specification provides a more complete example of state transitions for JDO 920.

Referring again to FIG. 8, an operation to manipulate the CMP persistent object and/or the persistent data that it represents is invoked at 830. Invoking an operation includes, for example, calling a method of a persistent object. In an embodiment, the invoked operation occurs within a transactional context. Examples of the invoked operation include: write, read, delete, create, flush, commit, and rollback.

The CMP persistent object may change state in response to the invoked operation. In an embodiment, the CMP persistent object state transition can be mapped to a JDO state transition. The mapping of CMP persistent object state transition to JDO state transition depends, at least in part, on which operation is invoked. Table 3 illustrates the mapping of state transitions if a read operation is invoked. In an alternative embodiment, more state transition mappings, fewer state transition mappings, and/or different state transition mappings may be possible.

TABLE 3

READ OPERATION

| CMP Persistent Object State Transitions | Corresponding JDO State Transitions |
| --- | --- |
| DEFAULT + not loaded to DEFAULT + loaded | Hollow to Persistent-Clean |
| DEFAULT + loaded to DEFAULT + loaded | Persistent-Clean to Persistent-Clean |
| UPDATED to UPDATED | Persistent-Dirty to Persistent-Dirty |
| CREATED to CREATED | Persistent-New to Persistent-New |
| V-REMOVED to error | Persistent-New-Deleted to error |
| REMOVED to error | Persistent-Deleted to error |

Table 4 illustrates the mapping of state transitions if a write operation is invoked. In an alternative embodiment, more state transition mappings, fewer state transition mappings, and/or different state transition mappings may be possible.

TABLE 4

WRITE OPERATION

| CMP Persistent Object State Transitions | Corresponding JDO State Transitions |
| --- | --- |
| DEFAULT + not loaded to UPDATED | Hollow to Persistent-Dirty |
| DEFAULT + loaded to UPDATED | Persistent-Clean to Persistent-Dirty |
| UPDATED to UPDATED | Persistent-Dirty to Persistent-Dirty |
| CREATED to CREATED | Persistent-New to Persistent-New |
| V_REMOVED to error | Persistent-New-Deleted to error |
| REMOVED to error | Persistent-Deleted to error |

Table 5 illustrates the mapping of state transitions if a delete operation is invoked. In an alternative embodiment, more state transition mappings, fewer state transition mappings, and/or different state transition mappings may be possible.

TABLE 5

DELETE OPERATION

| CMP Persistent Object State Transitions | Corresponding JDO State Transitions |
| --- | --- |
| DEFAULT + not loaded to REMOVED | Hollow to Persistent-Deleted |
| DEFAULT + loaded to REMOVED | Persistent-Clean to Persistent-Deleted |
| UPDATED to REMOVED | Persistent-Dirty to Persistent-Deleted |
| CREATED to V_REMOVED | Persistent-New to Persistent-New-Deleted |

Table 6 illustrates the mapping of state transitions if a flush operation is invoked. In an alternative embodiment, more state transition mappings, fewer state transition mappings, and/or different state transition mappings may be possible.

TABLE 6

FLUSH OPERATION

| CMP Persistent Object State Transitions | Corresponding JDO State Transitions |
| --- | --- |
| DEFAULT + not loaded to DEFAULT + not loaded | Hollow to Hollow |
| DEFAULT + loaded to DEFAULT + loaded | Persistent-Clean to Persistent-Clean |

Table 7 illustrates the mapping of state transitions if either a commit or a rollback operation is invoked. In an alternative embodiment, more state transition mappings, fewer state transition mappings, and/or different state transition mappings may be possible.

TABLE 7

COMMIT/ROLLBACK OPERATION

| CMP Persistent Object State Transitions | Corresponding JDO State Transitions |
| --- | --- |
| DEFAULT + not loaded to garbage collected | Hollow to Hollow to Transient |
| DEFAULT + loaded to garbage collected | Persistent-Clean to Hollow to Transient |
| UPDATED to garbage collected | Persistent-Dirty to Hollow to Transient |
| CREATED to garbage collected | Persistent-New to Hollow to Transient |
| V_REMOVED to garbage collected | Persistent-New-Deleted to Transient |
| REMOVED to garbage collected | Persistent-Deleted to Transient |

In an alternative embodiment more operations, fewer operations, and/or different operations may be invoked. In another alternative embodiment, only a selected subset of the mappings shown in Tables 3-7 is implemented.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It should be appreciated that the CMP persistent object states referred in this document and figures may be labeled as shown in Table 8. The labels in the right hand side column are alternative labels for clarification and do not change the meaning of the labels on the left hand side column as used in the description above and in figures.

TABLE 8

CMP STATES AND EQUIVALENT RE-LABELS

| CMP Persistent Object States | Relabeled CMP Persistent Object States |
| --- | --- |
| DEFAULT + not loaded | DEFAULT-AND-NOT-LOADED |
| DEFAULT + Not Loaded | DEFAULT-AND-NOT-LOADED |
| DEFAULT + loaded | DEFAULT-AND-LOADED |
| DEFAULT + Loaded | DEFAULT-AND-LOADED |
| V_REMOVED | V-REMOVED |

What is claimed is:

1. A computer-implemented method comprising:
   reading an object-relational (O/R) database mapping metadata file that provides a mapping of a Container-Managed Persistence (CMP) persistent object state and a Java Data Object state to a database;
   identifying the state of the CMP persistent object as being one of a predetermined set of CMP persistent object states; and
   mapping the state of the CMP persistent object to the Java Data Object state, in response to the state being identified as one of the predetermined CMP persistent object states, wherein the CMP persistent object is associated with a transactional context, and the mapping is based on the O/R database mapping metadata file;
   wherein the predetermined set of CMP persistent object states include DEFAULT AND-NOT-LOADED; DEFAULT-AND-LOADED; UPDATED; CREATED; REMOVED; and V-REMOVED and the Java Data Object states include Persistent-Clean, Hollow, Persistent-Dirty, Persistent-New, Persistent-Deleted, and Persistent-New-Deleted.

2. The method of claim 1, wherein the CMP persistent object is associated with a transactional context and wherein mapping the identified state of the CMP persistent object to the Java Data Object state comprises at least one of:
   mapping the DEFAULT-AND-LOADED state to a Persistent-Clean state;
   mapping the DEFAULT-AND-NOT-LOADED state to a Hollow state;
   mapping the UPDATED state to a Persistent-Dirty state;
   mapping the CREATED state to a Persistent-New state;
   mapping the REMOVED state to a Persistent-Deleted state; and
   mapping the V-REMOVED state to a Persistent-New-Deleted state.

3. The method of claim 2, further comprising:
   receiving an indication that a read operation is invoked; and
   mapping, in response to receiving the indication, a state transition of the CMP persistent object to a state transition of a Java Data Object.

4. The method of claim 3, wherein mapping the state transition of the CMP persistent object to the state transition of the Java Data Object comprises at least one of:
   mapping a DEFAULT-AND-NOT-LOADED to DEFAULT-AND-LOADED state transition to a Hollow to Persistent-Clean state transition;
   mapping a DEFAULT-AND-LOADED to DEFAULT-AND-LOADED state transition to a Persistent-Clean to Persistent-Clean state transition;
   mapping an UPDATED to UPDATED state transition to a Persistent-Dirty to Persistent-Dirty state transition;
   mapping a CREATED to CREATED state transition to a Persistent-New to Persistent-New state transition;
   mapping a V-REMOVED to error state transition to a Persistent-New-Deleted to error state transition; and
   mapping a REMOVED to error state transition to a Persistent-Deleted to error state transition.

5. The method of claim 2, further comprising:
   receiving an indication that a write operation is invoked; and
   mapping, in response to receiving the indication, a state transition of the CMP persistent object to a state transition of a Java Data Object.

6. The method of claim 5, wherein mapping the state transition of the CMP persistent object to the state transition of the Java Data Object comprises at least one of:
   mapping a DEFAULT-AND-NOT-LOADED to UPDATED state transition to a Hollow to Persistent-Dirty state transition;
   mapping a DEFAULT-AND-LOADED to UPDATED state transition to a Persistent-Clean to Persistent-Dirty state transition;
   mapping an UPDATED to UPDATED state transition to a Persistent-Dirty to Persistent-Dirty state transition;
   mapping a CREATED to CREATED state transition to a Persistent-New to Persistent-Dirty state transition;
   mapping a V-REMOVED to error state transition to a Persistent-New-Deleted to error state transition; and
   mapping a REMOVED to error state transition to a Persistent-Deleted to error state transition.

7. The method of claim 2, further comprising:
   receiving an indication that a delete operation is invoked; and
   mapping, in response to receiving the indication, a state transition of the CMP persistent object to a state transition of a Java Data Object.

8. The method of claim 7, wherein mapping the state transition of the CMP persistent object to the state transition of the Java Data Object comprises at least one of:
   mapping a DEFAULT-AND-NOT-LOADED to REMOVED state transition to a HOLLOW to Persistent-Deleted state transition;
   mapping a DEFAULT-AND-LOADED to REMOVED state transition to a Persistent-Clean to Persistent-Deleted state transition;
   mapping a UPDATED to REMOVED state transition to a Persistent-Dirty to Persistent-Deleted state transition; and mapping a CREATED to V-REMOVED state transition to a Persistent-New to Persistent-New-Deleted state transition.

9. The method of claim 2, further comprising:
receiving an indication that a flush operation is invoked; and
mapping, in response to receiving the indication, a state transition of the CMP persistent object to a state transition of a Java Data Object.

10. The method of claim 9, wherein mapping the state transition of the CMP persistent object to the state transition of the Java Data Object comprises at least one of:
mapping a DEFAULT-AND-NOT-LOADED to DEFAULT-AND-NOT-LOADED state transition to a Hollow to Hollow state transition; and
mapping a DEFAULT-AND-LOADED to DEFAULT-AND-LOADED state transition to a Persistent-Clean to Persistent-Clean state transition.

11. The method of claim 2, further comprising:
receiving an indication that at least one of a commit or rollback operation is invoked;
and mapping, in response to receiving the indication, a state transition of the CMP persistent object to a state transition of a Java Data Object.

12. The method of claim 11, wherein mapping the state transition of the CMP persistent object to the state transition of the Java Data Object comprises at least one of:
mapping a DEFAULT-AND-NOT-LOADED to garbage collected state transition to a Hollow to Hollow to Transient state transition;
mapping a DEFAULT-AND-LOADED to garbage collected state transition to a Persistent-Clean to Hollow to Transient state transition;
mapping an UPDATED to garbage collected state transition to a Persistent-Dirty to Hollow to Transient state transition;
mapping a CREATED to garbage collected state transition to a Persistent-New to Hollow to Transient state transition;
mapping a V-REMOVED to garbage collected state transition to a Persistent-New-Deleted to Transient state transition; and
mapping a REMOVED to garbage collected state transition to a Persistent-Deleted to Transient state transition.

13. The method of claim 2, wherein the CMP persistent object is associated with a non-transactional context and wherein mapping the identified state of the CMP persistent object to the Java Data Object state comprises at least one of:
mapping the DEFAULT-AND-LOADED state to a Persistent-non-transactional state;
and mapping the DEFAULT-AND-NOT-LOADED state to the Hollow state.

14. An apparatus comprising:
an application to access a persistent object; and
a processor and logic executable thereon to, reading an object-relational (O/R) database mapping metadata file that provides a mapping of a Container-Managed Persistence (CMP) persistent object state and a Java Data Object state to a database;
identify a state of a Container-Managed Persistence (CMP) persistent object, wherein the state of the CMP persistent object is one of a predetermined set of CMP persistent object states; and
map the state of the CMP persistent object to a Java Data Object state, in response to the identified state of the CMP persistent object, wherein the CMP persistent object is associated with a transactional context;
wherein the predetermined set of CMP persistent object states include DEFAULT-AND-NOT-LOADED; DEFAULT-AND-LOADED; UPDATED; CREATED; REMOVED; and V-REMOVED and the Java Data Object states include Persistent-Clean, Hollow, Persistent-Dirty, Persistent-New, Persistent-Deleted, and Persistent-New-Deleted.

15. The apparatus of claim 14, wherein the logic executable thereon to map the identified state of the CMP persistent object to the Java Data Object state comprises logic executable thereon to map at least one of:
the DEFAULT-AND-LOADED state to a Persistent-Clean state;
the DEFAULT-AND-NOT-LOADED state to a Hollow state;
the UPDATED state to a Persistent-Dirty state;
the CREATED state to a Persistent-New state;
the REMOVED state to a Persistent-Deleted state; and
the V-REMOVED state to a Persistent-New-Deleted state.

16. An article of manufacture comprising:
an electronically accessible medium providing instructions that, when executed by a computer, cause the computer to perform the method comprising:
reading an object-relational (O/R) database mapping metadata file that provides a mapping of a Container-Managed Persistence (CMP) persistent object state and a Java Data Object state to a database;
identifying a state of a Container-Managed Persistence (CMP) persistent object, wherein the state of the CMP persistent object is one of a predetermined set of CMP persistent object states; and
mapping the state of the CMP persistent object to a Java Data Object state, in response to the identified state of the CMP persistent object, wherein the CMP persistent object is associated with a transactional context;
wherein the predetermined set of CMP persistent object states include DEFAULT-AND-NOT-LOADED; DEFAULT-AND-LOADED; UPDATED; CREATED; REMOVED; and V-REMOVED and the Java Data Object states include Persistent-Clean, Hollow, Persistent-Dirty, Persistent-New, Persistent-Deleted, and Persistent-New-Deleted.

17. The article of manufacture of claim 16, wherein the instructions that, when executed by the apparatus, cause the apparatus to map the identified state of the CMP persistent object to the Java Data Object state, cause the apparatus to perform at least one of:
map the DEFAULT-AND-LOADED state to a Persistent-Clean state;
map the DEFAULT-AND-NOT-LOADED state to a Hollow state;
map the UPDATED state to a Persistent-Dirty state;
map the CREATED state to a Persistent-New state;
map the REMOVED state to a Persistent-Deleted state; and
map the V-REMOVED state to a Persistent-New-Deleted state.

* * * * *